United States Patent [19]

Gou et al.

[11] Patent Number: 4,889,682

[45] Date of Patent: Dec. 26, 1989

[54] PASSIVE COOLING SYSTEM FOR NUCLEAR REACTOR CONTAINMENT STRUCTURE

[75] Inventors: Perng-Fei Gou; Gentry E. Wade, both of Saratoga, Calif.

[73] Assignee: General Electric Company, San Jose, Calif.

[21] Appl. No.: 196,581

[22] Filed: May 20, 1988

[51] Int. Cl.[4] .............................................. G21C 15/18
[52] U.S. Cl. ...................................... 376/283; 376/298
[58] Field of Search ................ 376/283, 298, 299, 282, 376/292

[56] References Cited

U.S. PATENT DOCUMENTS 3,718,539  2/1973  West et al. ............................ 376/283
4,666,661  5/1987  Fredell et al. ......................... 376/299

FOREIGN PATENT DOCUMENTS 1614547  8/1970  Fed. Rep. of Germany ...... 376/283

*Primary Examiner*—Daniel Wasil
*Attorney, Agent, or Firm*—Robert R. Schroeder

[57] ABSTRACT

A passive cooling system for the contaminant structure of a nuclear reactor plant providing protection against overpressure within the containment attributable to inadvertent leakage or rupture of the system components. The cooling system utilizes natural convection for transferring heat imbalances and enables the discharge of irradiation free thermal energy to the atmosphere for heat disposal from the system.

10 Claims, 8 Drawing Sheets

SECTION 2-2

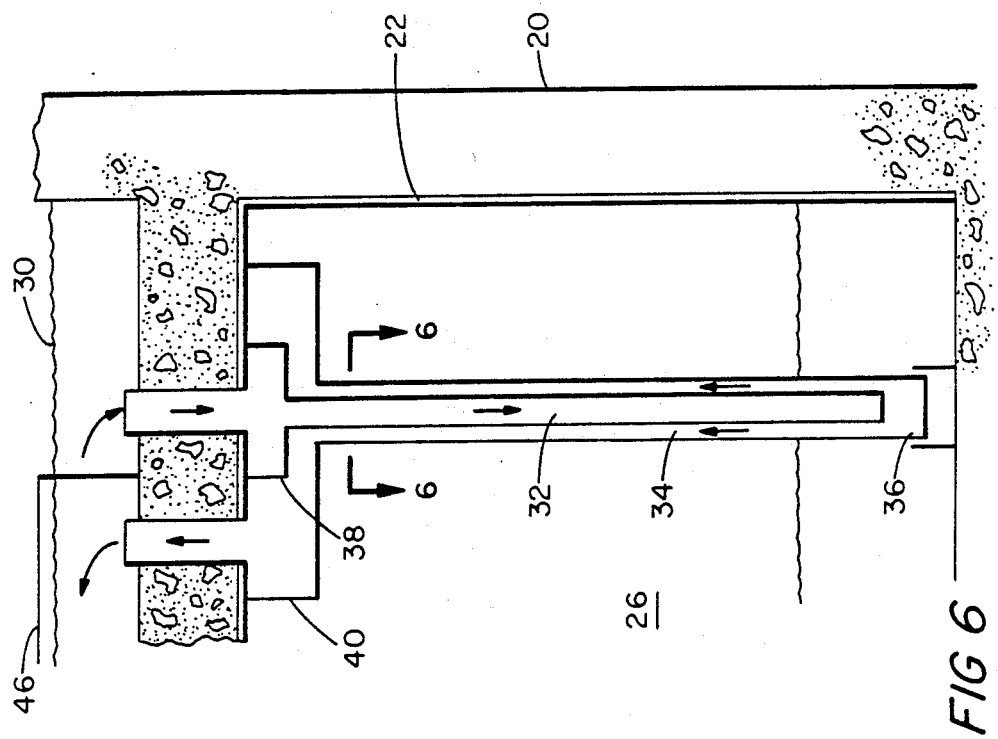
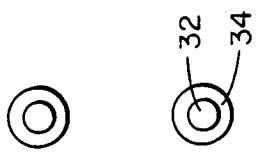
FIG 7
SECTION 6-6

SECTION 8-8

SECTION 3-3

SECTION 10-10

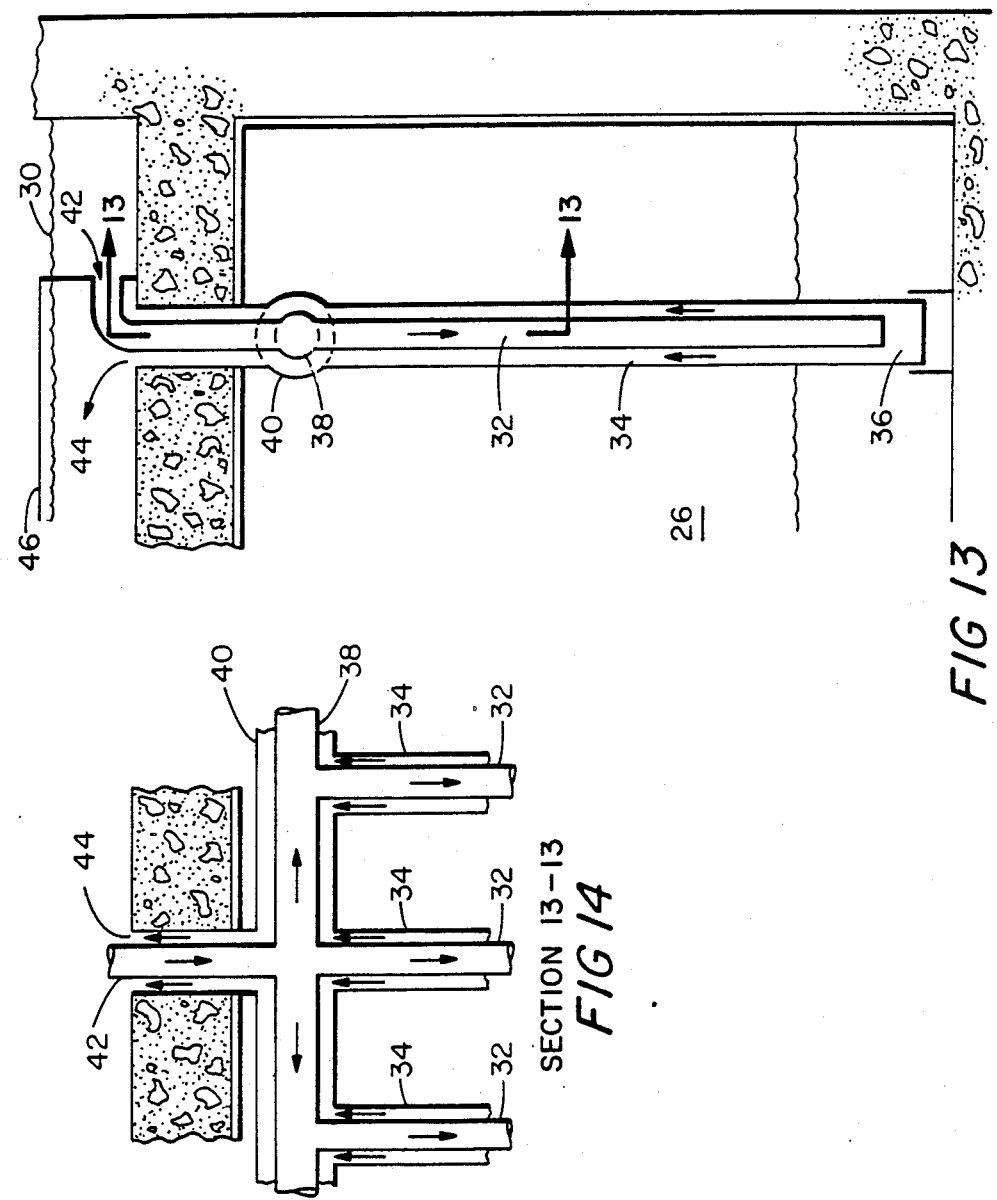

PASSIVE COOLING SYSTEM FOR NUCLEAR REACTOR CONTAINMENT STRUCTURE

The U.S. Government has rights in this invention pursuant to Contract No. DE-AC03-86SF16563 awarded by the U.S. Department of Energy.

FIELD OF THE INVENTION

This invention relates to liquid cooled, nuclear fission reactor plant complexes. The invention is particularly concerned with a passive or self-acting cooling system for the containment structure housing a fissionable fuel containing nuclear reactor.

BACKGROUND OF THE INVENTION

Typically nuclear fission reactors for power generation are housed within a containment structure as a safety measure. Nuclear reactor containments are designed and employed to enclose the nuclear reactor pressure vessel containing the core of heat generating fissionable fuel and ancillary components of the system, such as portions of the coolant/heat transfer means which constitute a source and/or means of conveyance of radiation and/or radioactive fission products. As such, the containment structure housing a nuclear reactor must effectively isolate the reactor system and components enclosed within its confines by sealing in all contents including any water, steam, gases or vapor and entrained fission products or other sources of radiation that may have escaped from the reactor vessel and in particular its associated cooling system.

The provision of a construction fulfilling such requirements with an effective fluid impermeable confinement structure securely isolating its enclosed contents from the external atmosphere does not generally present either a significant engineering or construction obstacle or achievement.

However, in the event of certain malfunctions in a nuclear reactor system, such as a loss of coolant, large volumes of very hot pressurized water may be released from the system into the interior of the containment structure. This very hot pressurized water flashes into steam which may carry along radioactive fission products, and substantially increase the pressure and temperature within the containment structure. Such accidents can produce very high pressures and temperatures within the confines of the "leak proof" containment structure thereby imposing heavy demands upon its integrity and ability to perform its designed role of retaining all potentially hazardous matter derived from the nuclear reactor system.

Potentially deleterious high pressure due to the inherent high thermal energy and flashing steam cannot simply be released by venting from the containment or otherwise permitted to escape to the outside atmosphere since the steam vapor may entrain and carry radioactive fission products which would also be released into the environment.

A variety of suppression schemes have been proposed and devised to cope with the problem of excessive pressure. They include a variety of measures or arrangements for condensing evolving or flashing steam and reducing the resultant over-pressure caused by accidents, for example, the designs disclosed in U.S. Letters Pat. Nos. 3,713,968; 4,362,693; 4,473,528; and 4,526,743.

In the absence of an effective suppression means to mitigate steam generated high pressures, the enveloping containment structure must be designed and constructed at excessively high costs and maintained to resist and retain substantial internal fluid pressures. Nevertheless, even a significantly reinforced containment structure cannot be assured to be resistant to breaching considering the temperature/pressure potential of a typical power generating nuclear reactor plant.

SUMMARY OF THE INVENTION

This invention comprises a passive cooling system for the containment structure of a nuclear fission reactor plant. The cooling system provides means for lowering the temperature of the interior environment of a reactor containment to relieve or preclude over-pressure therein by reducing ambient temperatures and thus condensing steam. The passive cooling system entails a heat transfer sequence that permits the safe dissipation of thermal energy out into the environment free of contaminating radioactive fission products.

OBJECTS OF THE INVENTION

It is a primary object of this invention to provide a new and improved containment system for nuclear fission reactor plants.

It is also an object of this invention to provide a passive cooling system for nuclear fission reactor containment structures.

It is a further object of this invention to provide functional improvements in a nuclear reactor containment comprising a passive or self-acting cooling arrangement.

It is a still further object of this invention to provide passive pressure suppression system for containment structures of nuclear reactor plants.

It is another object of this invention to provide a cooling system for nuclear fission reactor containment structures which is based upon natural convection heat transfer.

BRIEF DESCRIPTION OF THE DRAWINGS

FIG. 6 is an alternate form of the cold and hot flow conduits;

FIG. 7 is a transverse cross-sectional view taken along line 6—6 of the illustration of FIG. 6;

FIG. 13 is a variation of the form of FIG. 10; and

FIG. 14 is a side view of a portion of FIG. 13.

DETAILED DESCRIPTION OF THE INVENTION

Figure 1:
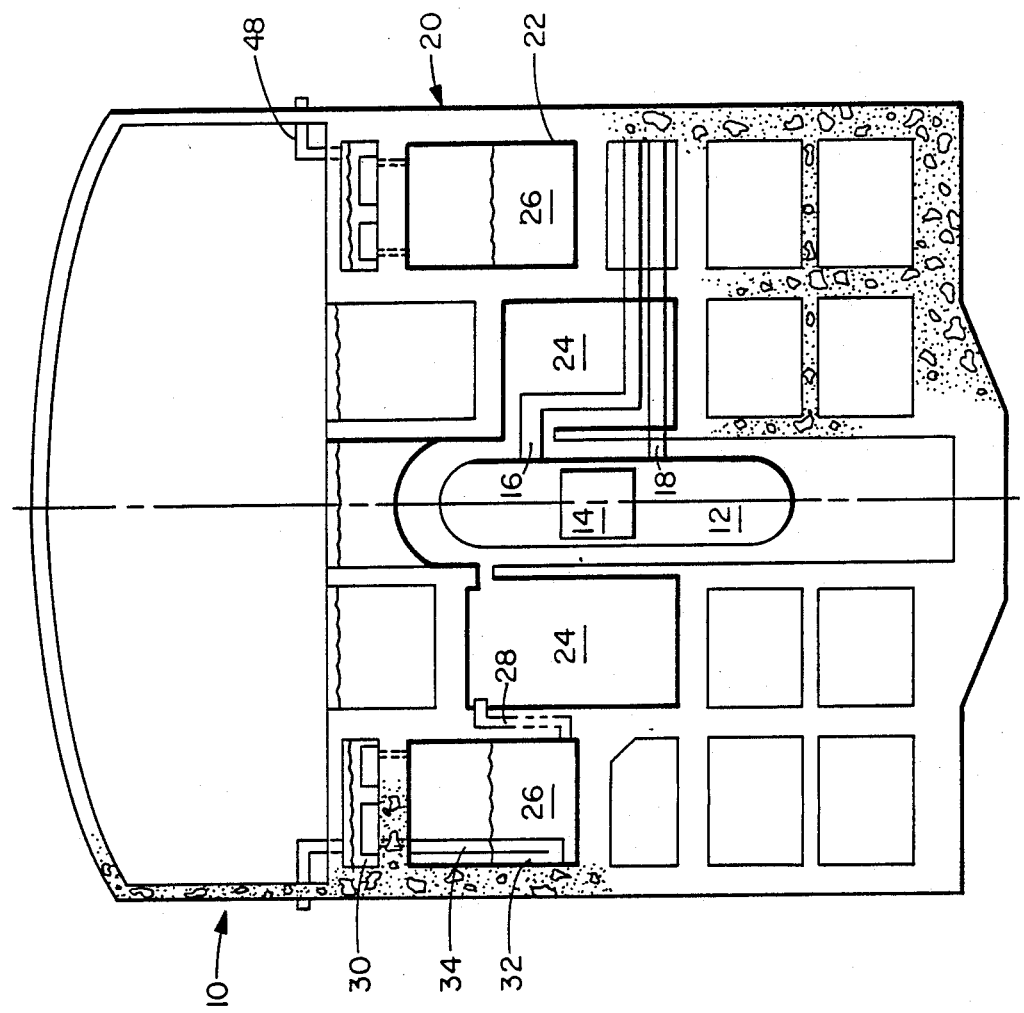
FIG. 1 is a vertical sectional view of a containment structure housing a nuclear reactor plant with part in elevation.

Referring to the drawings, in particular FIG. 1, a nuclear reactor plant complex 10 comprises the nuclear reactor consisting of a pressure vessel 12 containing a heat producing core of fissionable fuel 14. The fuel gives up its generated heat from fission to a surrounding coolant, typically comprising water for either the direct generation of steam as in a so-called boiling water reactor, or to function as heat transfer medium for the indirect generation of steam as in a so-called pressure water reactor. Coolant circulating pipes 16 and 18 provide for the circulation of coolant water into the reactor pressure vessel 12 for transfer of the heat output of the fuel, and conveyance of the heated water and/or steam from the pressure vessel to its use such as electrical power generation whereupon it recycles through the circuit.

The nuclear reactor comprising its pressure vessel 12 with fuel core 14 and certain related components is enclosed within a containment structure 20. The containment structure 20 includes a fluid impermeable liner 22 on the structure which includes a base or floor, a vertical side wall(s) and dome or roof which is designed to prevent the escape from the confines of any radioactive material to the outer atmosphere.

In a typical water cooled nuclear reactor plant, the containment structure 20, in addition to the reactor pressure vessel 12 includes a number of cell-like chambers or compartments designed for the performance of specific functions or objectives. For instance, the reactor pressure vessel 12 can be surrounded by one or more adjacent chambers providing a drywell(s) 24 to receive and retain any overflow or spillage of water, steam or other vapor resulting from leakage or other sources in connection with the reactor operation.

One or more chambers partially filled with water provide a suppression pool(s) 26 for cooling and condensing steam beneath the surface of the water pool therein. Suppression pool chamber(s) 26 is in fluid communication with one or more drywell chambers 24 through conduits 28 which opens at one terminal end into an upper portion of drywell chamber 24 and at its other terminal end into the suppression pool chamber 26 at a lower region below the surface of the water pool contained therein. Thus, any steam escaping or flashing from water leaking from the high temperature and pressure confines of the pressure vessel and its connecting circuits will be received in the drywell chamber(s) 24. The inherent pressure of the steam escaping or flashing from emerging hot water will ultimately be forced from the drywell chamber(s) 24 through conduit(s) 28 into the suppression pool chamber(s) 26 at a location beneath the surface of the water pool therein. The submerged contact of the steam with the pool water condenses it and thereby reduces the steam increased pressures within the containment structure 20 initially produced by the leaking steam or flashing from escaping high temperature and pressure water.

In accordance with a preferred embodiment of the invention one or more compartments containing water comprising a refill pool(s) 30 is provided overhead and adjacent to the suppression pool chamber(s) 26.

A multiplicity of conduits 32 and 34 are located within the suppression pool chamber(s) 26 adjoining a side wall thereof. Conduits 32 are positioned adjoining the inner wall surface of the suppression pool chamber 26. Conduits 32 and 34 extend from the upper portion of the suppression pool chamber(s) 26 down to the bottom thereof where conduits 32 are joined in fluid communication with conduits 34 through a junction 36 which typically comprises a U-shaped connection. Conduits 34 are positioned adjoining conduits 32 and with a surface exposed to the interior environment of suppression pool chamber 26 and extend upward from a junction 36 with conduits 32 adjacent to the bottom of chamber 30 to the upper region thereof. Accordingly conduits 32 joined with conduits 34 through a junction 36 provide a multiplicity of fluid circuits extending down in conduits 32 adjoining a wall of the suppression pool chamber 26, and intermediate said wall and conduits 34, then around junction 36 and backup through conduits 34 with a surface exposed to the interior environment of the suppression pool chamber 26.

Figure 3:
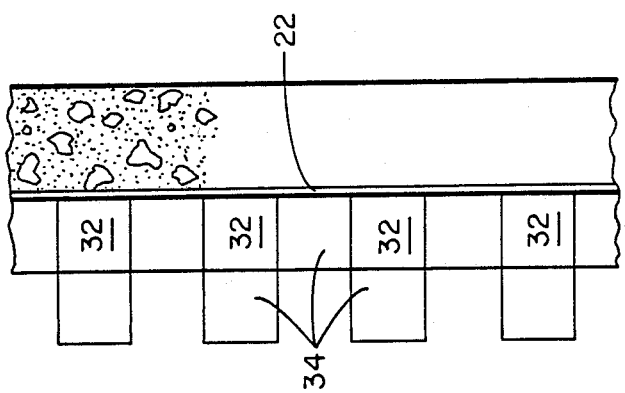
FIG. 3 is a transverse cross-sectional view taken along 2—2 of the illustration of FIG. 2.
Figure 8:
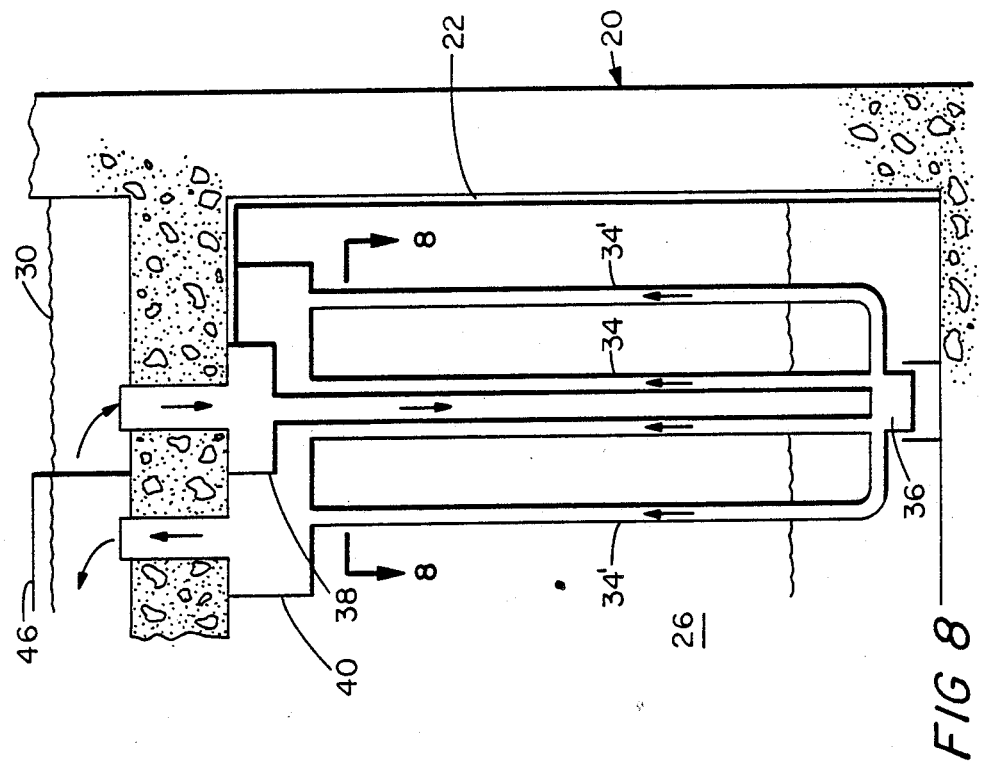
FIG. 8 is a variation of the form of FIG. 6.
Figure 9:
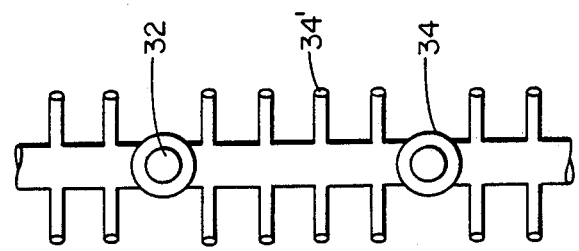
FIG. 9 is a transverse cross-sectional view taken along line 8—8 of the illustration of FIG. 8.
Figure 10:
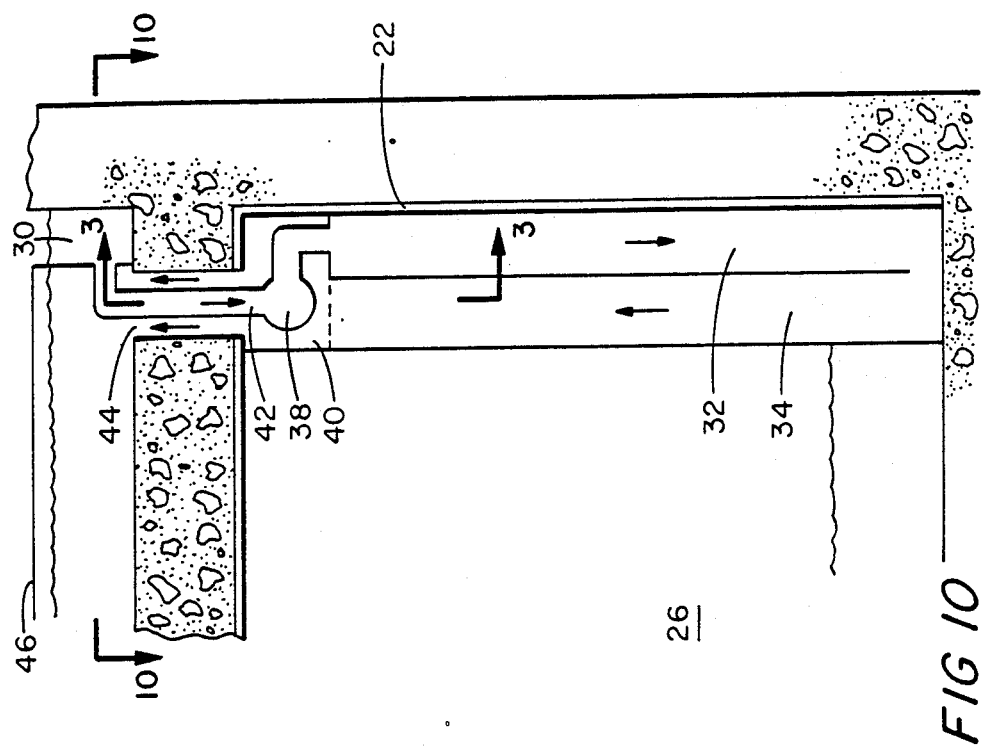
FIG. 10 is an alternate form of the first and second headers or manifolds.
Figure 11:
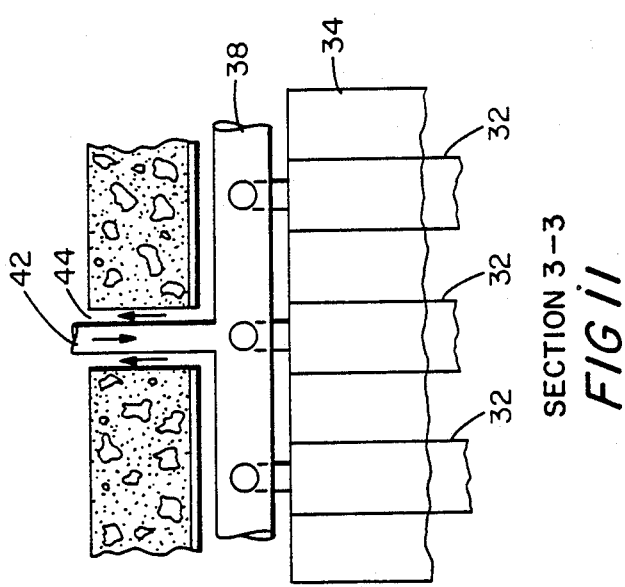
FIG. 11 is a side view of a portion of FIG. 10.
Figure 12:
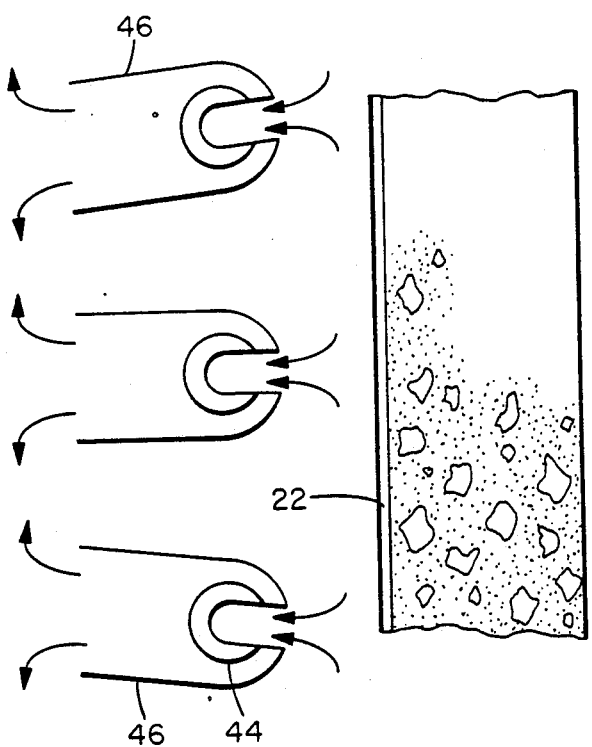
FIG. 12 is a transverse cross-sectional view taken along line 10—10 of the illustration of FIG. 10.

Conduits 32 and 34 projecting down into the suppression pool chamber(s) 26 can be arranged in a pattern of a staggered array with a conduits 32 adjoining the suppression pool chamber 26 wall and intermediate said wall and conduit 34 whereby conduits 32 do not have a surface exposed to the interior of the suppression pool chamber 26. All conduits 34 have a surface exposed to the interior of the suppression pool chamber 26. This staggered array arrangement is illustrated in FIG. 3 with conduit 32 provided for cold flow and conduit 34 provided for hot flow. Alternatively conduits 32 and 34 can be provided in a telescoping arrangement of a pair of concentric pipes with a relatively small diameter conduit 32 for cold flow enclosed within a relatively larger diameter conduit 34 for the hot flow as shown in FIG. 6. This concentric pipe embodiment of the invention can be provided in a variety of designs comprising, for example, a plurality of the concentric units grouped in modules or bundles, aligned in rows or other patterns. One variation on this embodiment is shown in FIG. 8 where the outer pipe of the concentric arrangement comprising a conduit 34 for hot flow is provided with a multiplicity of smaller outlying generally parallel branch conduits $34^1$ deployed in an extended parallel pattern adjacent to the main conduit 34 for hot flow and which encloses the cold flow conduit 32.

The flow arrangements provided by this system based upon gravity and convection heat transfer concepts are typical of the many types that are utilized to provide the cooling effect with liquid isolated from radiation products supplied by the refill pool compartment(s) 30.

The upper or terminal ends of conduits 32 make contact with and are in fluid communication with a first cold flow header 38, or manifold, and the upper or terminal ends of conduits 34 make contact with and are in fluid communication with a second hot flow header 40, or manifold. The first and second headers 38 and 40 are in fluid communication through ducts 42 and 44, respectively, with a refill pool compartment 30. Ducts 42 and 44, leading from headers 38 and 40, respectively, each enter and make fluid contact with the refill pool compartment 30 on opposite sides of a baffle 46, as shown in FIGS. 2, 4 and 5.

Accordingly, conduits 32 and 34 provide a flow path from one side of the baffle 46 in refill pool compartment 30, via ducts 42 and 44 and headers 38 and 40 down through suppression pool chamber 26 and back up to refill pool compartment 30 on the other side of the baffle 46.

Figure 2:
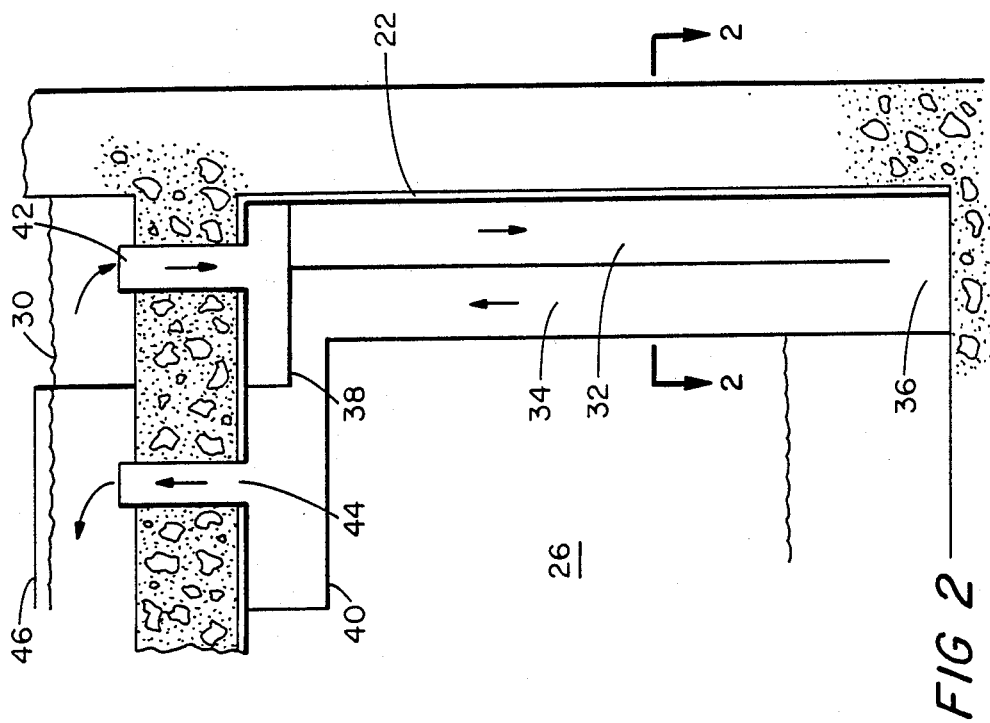
FIG. 2 is a detailed, enlarged sectional view of a portion of a suppression pool chamber and overhead refill pool compartment shown in FIG. 1.
Figure 4:
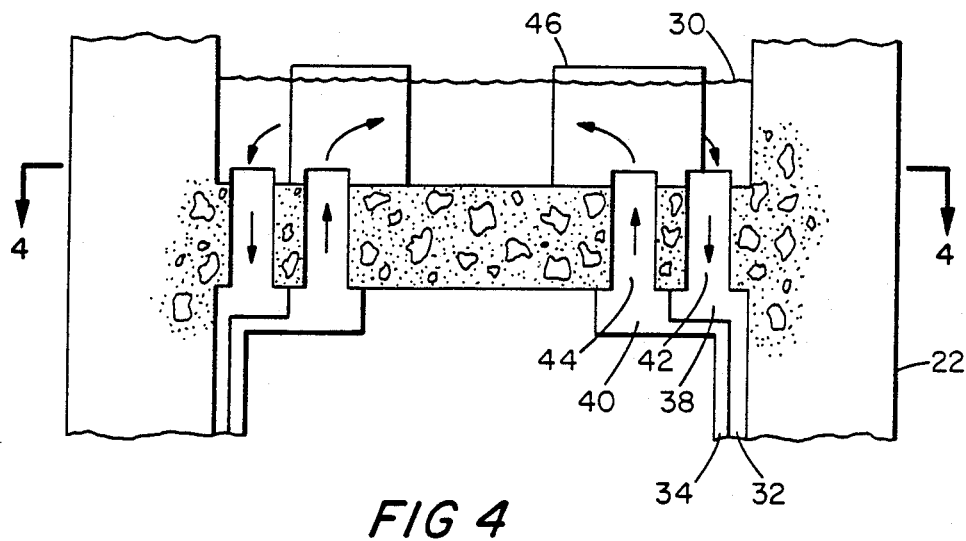
FIG. 4 is a detailed, enlarged sectional view of the upper portion of a suppression pool chamber and the overhead refill pool compartment shown in FIG. 1.
Figure 5:
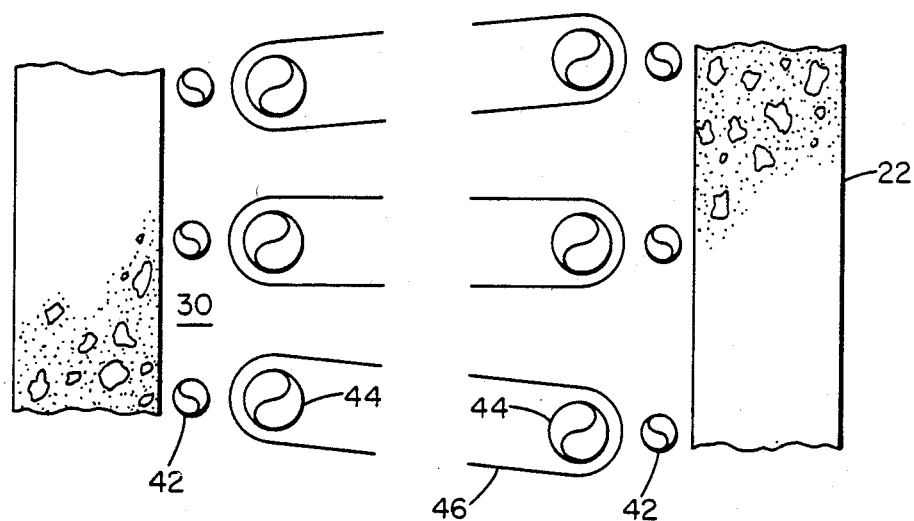
FIG. 5 is a transverse cross-sectional view taken along line 4—4 of the illustration of FIG. 4.

Alternative embodiments for the headers and ducts shown in FIGS. 2, 4 and 5, for the distribution of cold flow to conduits 32 and collection of hot flow from conduits 34 in their respective fluid communication with the refill pool 30, are illustrated in FIGS. 10 through 14. An alternate form provides for the upper end of conduit 32 to make contact and fluid communication with a cold header 38 which is located within the hot header 40 making contact and in fluid communication with the end of conduit 34. Also cold duct 42 connecting header 38 to the refill pool 30 passes through hot duct 44 which connects header 40 to refill pool 30 at a location opposite babble 46 from duct 42.

In accordance with the preferred embodiment of this invention, overpressure within the containment structure 20, due for instance to steam leaking or flashing from escaping hot pressurized water attributable to equipment failure or other causes, is reduced and controlled over extended periods with the above described system as follows. Rising pressure produced by steam leaking or flashing from escaping water into the drywell chamber(s) 24 forces the steam and hot vapor through conduit(s) 28 into suppression pool chamber(s) 26 below the surface of the water contained therein. The steam is condensed in the suppression pool, diminishing the pressure, while adding to the temperature of the suppression pool and reducing its capacity for further condensation of extended steam release.

The passive cooling system of this invention is self-activated and maintained by the rising temperature of the suppression pool 26 water through the natural convection heat movement and transfer. The increasing temperature in the suppression pool chamber 26 will transfer energy to the exposed surface of conduits 34 heating and vaporizing the water contained therein, initiating a convection circulation of the heated water and/or vapor upward through conduits 34 into header 40. From header 40 the heated water and/or vapor flows through duct 44 and enters the refill pool compartment 30 and gives up thermal energy which is dissipated by evaporation. To replace the upward circulating heated water in conduits 34, cooler water flows down from the other side of the baffle 46 from the refill pool compartment 30 through header 38 and conduits 32, cooling the wall of the suppression chamber and containment structures 20. The circulating water then passes to and through junction 36 for recycling back up conduits 34 carrying off additional thermal energy from the suppression pool chamber 26. Thus, the passive cooling system of the invention will continue to relieve overpressure attributable to steam by condensing and cooling through the medium by a natural convection heat transfer mechanism which will self-activate and continue as long as water is maintained in the refill pool compartment(s) 30. Suitable means can be employed to provide an ample volume of refill pool water or supply additional quantities as needed.

Moreover, since the refill pool compartment 30 and conduits 32 and 34 with their accompanying connections comprise a separate circulating system whereby the water/vapor heat transfer medium contained therein is physically isolated from the nuclear reactor system, it does not become contaminated with radioactive material Thus, water and/or vapor from this segregated portion of the cooling and condensing system can be released to the outside environment without polluting or causing any health hazards. Vents 48 in the refill pool(s) can be provided to relieve pressure and heat with vapor free of any radioactive contamination from the refill pool compartment(s) 30 to the atmosphere.

The passive cooling system of this invention provides an advantageous means for removing postaccident fuel decay heat from the reactor system and containment housing. The cooling system functions are self-acting and independent of any operating personnel, and functions on its own for extended period without intervention. For example, an adequate water supply can be provided for the refill pool compartment to provide for independent operation of three days, providing ample time for remedial action.

What is claimed is:

1. The passive cooling natural circulation system for the containment structure of a nuclear reactor plant which provides overpressure protection within the containment housing, comprising a nuclear reactor assembly having a pressure vessel with a heat producing core of fissionable fuel enclosed therein and at least one conduit in fluid communication with the interior of the pressure vessel extending out therefrom, a drywell chamber adjacent to said pressure vessel, a suppression pool chamber for retaining a cooling liquid and having a conduit providing fluid communication between said drywell chamber and suppression pool chamber, a compartment providing a liquid refill pool for liquid water isolated from radioactive fission products located overhead of the suppression pool chamber, a multiplicity of conduits arranged in a staggered array extending downward into the suppression pool chamber adjoining a wall thereof, said conduits being joined at their lower extremities with an adjacent conduit through a junction to provide a closed circuit therethrough for the passage of fluid down into the suppression pool chamber from above and return up to above said chamber, said multiplicity of adjacent conduits having such terminal end extending upward from their lower junction in fluid communication with the refill pool compartment overhead of the suppression pool chamber have one terminal end in fluid communication with the refill pool compartment on one side of a baffle provided therein and the other terminal end in fluid communication with the refill pool compartment on the other side of the baffle whereby liquid contained within the overhead refill pool compartment can circulate down via the conduits through the contents of the suppression pool chamber and return back up to the refill pool compartment thereby removing heat from the containment structures.

2. The passive cooling natural circulation system of claim 1, wherein the conduits joined at their lower extremities through a junction with an adjacent conduit have one terminal end in fluid communication with the refill pool compartment through a first header and the other terminal end in fluid communication with the refill pool compartment through a second header.

3. The passive cooling natural circulation system of claim 1, wherein the multiplicity of conduits arranged in a staggered array extending downward into the suppression pool chamber adjoining a wall thereof and joined at their lower extremities with an adjacent conduit through a junction have one conduit section extending upward from a junction with a surface exposed to the interior of the suppression pool chamber and its contents and another conduit section extending upward from the junction positioned intermediate the chamber wall and the conduit section with the exposed surface.

4. A passive cooling natural circulation system for the containment structure of a nuclear reactor plant which provides overpressure protection within the containment housing, comprising a nuclear reactor assembly having a pressure vessel with a heat producing core of fissionable fuel enclosed therein and at least one conduit in fluid communication with the interior of the pressure vessel extending out therefrom, a drywell chamber adjacent to said pressure vessel, a suppression pool chamber for retaining a cooling liquid and having a conduit providing fluid communication between said drywell chamber and suppression pool chamber, a compartment providing a liquid refill pool for water isolated from radioactive fission products located overhead of the suppression pool chamber, a multiplicity of conduits arranged in a staggered array extending downward into the suppression pool chamber adjoining a wall thereof, said conduits being joined at their lower extremities with an adjacent conduit through a junction to provide a closed circuit therethrough and having one terminal end in fluid communication with the refill pool compartment on one side of a baffle provided therein and the other terminal end in fluid communication with the refill pool compartment on the other side of the baffle to provide a closed circuit for the passage of fluid down from the refill pool compartment into the suppression pool chamber and return back up to the refill pool compartment.

5. The passive cooling natural circulation system of claim 6, wherein the conduits joined at their lower extremities though a junction with an adjacent conduit have one terminal end in fluid communication with the refill pool compartment through a first header and the other terminal end in fluid communication with the refill pool compartment through a second header.

6. The passive cooling natural circulation system of claim 6, wherein the multiplicity of conduits arranged in a staggered array extending downward into the suppression pool chamber adjoining a wall thereof and joined at their lower extremities with an adjacent conduit through a junction having one conduit section extending upward from a junction with a surface exposed to the interior of the suppression pool chamber and its contents and another conduit section extending upward from the junction positioned intermediate the chamber wall and the conduit section with the exposed surface.

7. A passive cooling natural circulation system for the containment structure of a nuclear reactor plant which provides overpressure protection within the containment housing, comprising a nuclear reactor assembly having a pressure vessel with a heat producing core of fissionable fuel enclosed therein and at least one conduit in fluid communication with the interior of the pressure vessel extending out therefrom, a drywell chamber adjacent to said pressure vessel, a suppression pool chamber for retaining a cooling liquid and having a conduit providing fluid communication between said drywell chamber and suppression pool chamber, a compartment providing a liquid refill pool for liquid water isolated from radioactive fission products located overhead of the suppression pool chamber, a multiplicity of paired concentric conduits in telescoping arrangement extending downward into the suppression pool chamber intermediate the walls thereof, said conduits being joined at their lower extremities with an adjacent conduit through a junction to provide a closed circuit therethrough for the passage of fluid down into the suppression pool chamber from above and return up to above said chamber, said multiplicity of paired concentric conduits having such terminal and extending upward from their lower junction in fluid communication with the refill pool compartment overhead of the suppression pool chamber whereby liquid contained within the overhead refill pool compartment can circulate down via the conduits through the contents of the suppression pool chamber and return back up to the refill pool compartment thereby removing heat from the containment structures.

8. The passive cooling natural circulating system of claim 7, wherein the multiplicity of conduits comprise units of two conduits paired together in concentric telescoping arrangement and being joined at their lower extremities through a junction to provide a closed circuit through the two paired conduits for the passage of fluid down into the suppressive pool chamber from above and return up to above said chamber.

9. The passive cooling natural circulating system of claim 7, wherein the multiplicity of conduits comprising units of two conduits paired together in telescoping arrangement include a smaller diameter inner pipe for cold flow concentrically surrounded by a larger diameter outer pipe for hot flow.

10. The passive cooling natural circulating system of claim 9, wherein the multiplicity of conduits comprising units of two conduits paired together in telescoping arrangement with a smaller diameter inner pipe for cold flow concentrically surrounded by a larger diameter outer pipe for hot flow include a plurality of small outlying branch pipes extending in fluid communication from the larger diameter outer pipe and deployed in an adjacent parallel pattern thereto for partial hot flow parallel with said large diameter outer pipe concentrically surrounding the smaller inner pipe for cold flow.

* * * * *